(12) United States Patent
Cheikh et al.

(10) Patent No.: US 12,259,519 B2
(45) Date of Patent: Mar. 25, 2025

(54) WEATHER DRONE

(71) Applicant: SITA Information Networking Computing UK Limited, Hayes (GB)

(72) Inventors: Stephane Cheikh, Hayes (GB); Thierry Le Gall, Hayes (GB)

(73) Assignee: SITA Information Networking Computing UK Limited ( * ) Notice: Subject to any disclaimer, the term of this patent is extended or adjusted under 35 U.S.C. 154(b) by 0 days.

(21) Appl. No.: 17/774,557

(22) PCT Filed: Dec. 23, 2020

(86) PCT No.: PCT/GB2020/053355
§ 371 (c)(1),
(2) Date: May 5, 2022

(87) PCT Pub. No.: WO2021/130490
PCT Pub. Date: Jul. 1, 2021

(65) Prior Publication Data
US 2023/0003919 A1 Jan. 5, 2023

(30) Foreign Application Priority Data
Dec. 23, 2019 (GB) .................... 1919248

(51) Int. Cl.
*G01W 1/08* (2006.01)
*G01D 1/18* (2006.01)
(Continued)

(52) U.S. Cl.
CPC .............. *G01W 1/08* (2013.01); *G01D 1/18* (2013.01); *G01W 1/02* (2013.01); *G08G 5/0013* (2013.01); *G08G 5/0069* (2013.01); *H04W 4/42* (2018.02)

(58) Field of Classification Search
CPC .... A63B 2220/70; B64U 70/97; B63B 79/15; F42B 15/08; G01D 1/18; G01W 1/08;
(Continued)

(56) References Cited

U.S. PATENT DOCUMENTS 9,334,052 B2   5/2016  Pasko et al.
9,696,458 B2   7/2017  Fengler
(Continued)

FOREIGN PATENT DOCUMENTS

CN      208334683 U    4/2019
DE    102007039095 A1  2/2009
(Continued)

OTHER PUBLICATIONS

World Meteorological Organization (2017) Guide to Meteorological Instruments and Methods of Observation. 2014 Edition, updated in 2017. Geneva, Switzerland, World Meteorological Organization, 1177pp. (WMO No. 8). (Year: 2017).*
(Continued)

*Primary Examiner* — Daniel R Miller
*Assistant Examiner* — Eric Sebastian Von Wald
(74) *Attorney, Agent, or Firm* — Morris, Manning & Martin, LLP; Daniel E. Sineway, Esq.; Adam J. Thompson, Esq.

(57) ABSTRACT

A weather drone comprising: a first sensor configured to repeatedly measure one or more parameters indicative of weather; a memory coupled to the first sensor and configured to store data recorded by the first sensor, the data comprising a series of repeatedly measured parameters; and a processor coupled to the first sensor and the memory. The processor is configured to analyse the data as it is being recorded by the first sensor, and determine if the data exceeds a first threshold value and/or falls below a second threshold value. If the processor determines that the data
(Continued)

exceeds the first threshold value and/or falls below the second threshold value on at least one occasion, the processor is configured to prevent the storage of further data from the first sensor in the memory.

9 Claims, 1 Drawing Sheet

(51) Int. Cl.
*G01W 1/02* (2006.01)
*G08G 5/00* (2006.01)
*H04W 4/42* (2018.01)

(58) Field of Classification Search
CPC ..... G01W 1/02; G01W 1/10; G01W 2203/00; G01W 1/04; G05D 1/101; G05D 1/0011; G08G 5/0013; H04W 4/42; H04W 4/38; H04W 4/44
See application file for complete search history.

(56) References Cited

U.S. PATENT DOCUMENTS

| | | | |
|---|---|---|---|
| 9,864,372 B2 | 1/2018 | Chen et al. | |
| 2007/0150136 A1* | 6/2007 | Doll | B60T 8/885 |
| | | | 701/29.2 |
| 2008/0167822 A1* | 7/2008 | Loukos | G01W 1/10 |
| | | | 702/179 |
| 2014/0358442 A1* | 12/2014 | Akhlaq | G01W 1/02 |
| | | | 702/3 |
| 2017/0090069 A1 | 3/2017 | Kirby | |
| 2017/0263133 A1* | 9/2017 | Blomberg | G08G 5/0069 |
| 2018/0018884 A1 | 1/2018 | Giusti et al. | |
| 2018/0123612 A1* | 5/2018 | Pyayt | H03M 7/3059 |
| 2018/0205658 A1* | 7/2018 | Sullivan | H04L 67/12 |
| 2018/0302440 A1* | 10/2018 | Hu | H04L 43/0817 |
| 2018/0350245 A1* | 12/2018 | Priest | G08G 5/045 |
| 2018/0364714 A1* | 12/2018 | Anderson | G05D 1/0027 |
| 2019/0272458 A1* | 9/2019 | Khoche | H04M 1/72454 |
| 2020/0001735 A1* | 1/2020 | Cheng | B64U 10/13 |
| 2020/0202640 A1* | 6/2020 | Tucker | G07C 5/085 |

FOREIGN PATENT DOCUMENTS

| | | |
|---|---|---|
| EP | 1072904 A2 | 1/2001 |
| KR | 101602171 B1 | 3/2016 |
| KR | 20180031298 A | 3/2018 |
| KR | 20190125872 A | 11/2019 |
| WO | 2017053808 A1 | 3/2017 |
| WO | 2017100579 A1 | 6/2017 |
| WO | 2021130490 A1 | 7/2021 |

OTHER PUBLICATIONS

Combined Search and Examination Report issued in Application No. GB1919248.3, dated Apr. 30, 2020.
International Search Report & Written Opinion issued in International Application No. PCT/GB2020/053355 mailed Mar. 23, 2021, (date of completion Mar. 17, 2021); 10 pages.

* cited by examiner

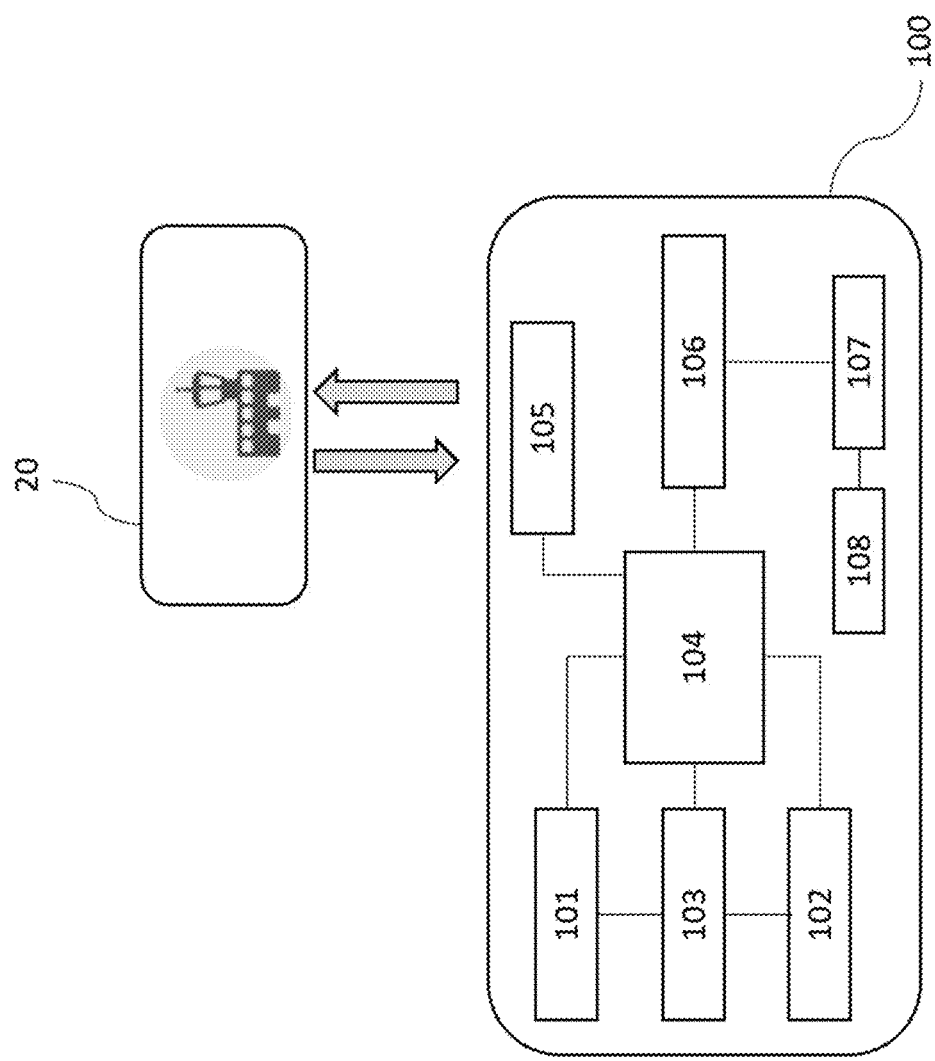

WEATHER DRONE

CROSS REFERENCE TO RELATED APPLICATIONS

This application is a national phase application of, and claims benefit of and priority to International Application No. PCT/GB2020/053355, filed Dec. 23, 2020, entitled "WEATHER DRONE," which claims priority to Great Britain Application No. 1919248.3, filed Dec. 23, 2019, entitled "WEATHER DRONE," the disclosures of which are herein incorporated by reference as if set forth herein in their entireties.

FIELD OF THE INVENTION

This invention relates to a weather drone.

BACKGROUND TO THE INVENTION

The measurement and analysis of weather data is becoming increasingly important for a number of different commercial and civil operations. Historically, weather data has been measured and analysed by national or regional Meteorological Offices, through a range of ground based facilities. Such measurements can be further supplemented through the likes of satellite facilities, as well as weather balloons, to obtain a more comprehensive pool of weather data.

More recently, some weather data has been collected through one or more unmanned aircraft or Unmanned Aerial Vehicles (UAVs), sometimes referred to as drones. The drone may be equipped with one or more weather sensors and configured to fly to a predefined region to collect weather data. The drone may be provided with an on-board transmitter to transmit any measured weather data back to a base. However, it may not always be possible for a transmission signal from a drone to reliably reach the base. For example, in some cases, the drone may fly to a region having environmental conditions, which prevent a signal reaching the base. In such cases, the drone may be provided with an on-board memory for storage of any measured weather data. After the drone has measured and recorded a pre-determined amount of weather data, the drone may then return to the base to allow for the stored data to be captured and analysed at the base.

The present invention seeks to provide a weather drone, which can capture weather data in an improved, reliable and efficient manner.

BACKGROUND TO THE INVENTION

The invention is defined in the independent claims, to which reference should be made. Preferred features are set out in the dependent claims.

According to a first aspect of the invention, there is provided a weather drone. The weather drone comprises a first sensor configured to repeatedly measure one or more parameters indicative of weather; a memory coupled to the first sensor and configured to store data recorded by the first sensor, the data comprising a series of repeatedly measured parameters; and a processor coupled to the first sensor and the memory. The processor is configured to analyse the data as it is being recorded by the first sensor, and determine if the data exceeds a first threshold value and/or falls below a second threshold value. If the processor determines that the data exceeds the first threshold value and/or falls below the second threshold value on at least one occasion, the processor is configured to prevent the storage of further data from the first sensor in the memory.

In many cases, weather drones spend prolonged periods of time in flight and capture a substantial amount of weather data. Where said weather data is captured and stored on the weather drone, the data must be transferred to a ground based system, once the drone has landed. There may be significant computation time and resources needed to process the large weather data files from the drones. The weather data files may provide valuable information for current or future weather prediction. However, occasionally the sensors on the drones break or malfunction and consequently record corrupt data. The present inventors have appreciated that such circumstances can be particularly undesirable, since they can result in significant time and computational resources being lost in handling and identifying corrupt weather data.

To address such a problem, the present inventors have appreciated that it can be beneficial to provide a weather drone in accordance with the first aspect of the present invention. In particular, the present inventors have appreciated that it can be beneficial to provide a weather drone having a processor configured to analyse the data as it is being recorded by the first sensor, and determine if the data exceeds a first threshold value and/or falls below a second threshold value. With such analysis, if the processor determines that the data exceeds the first threshold value and/or falls below the second threshold value on at least one occasion, the processor is configured to prevent the storage of further data from the first sensor in the memory. In this way, the on-board computing infrastructure of the weather drone can monitor the weather data with minimal computational resources and power and identify any early signs of a sensor beginning to break and/or malfunction. This advantageously means that the weather drone does not unnecessarily record and store a large volume of corrupt weather data, and consequently means that less time and computational resources are needed in the ground based system to handle and identify corrupt weather data.

It will be appreciated that the term 'drone' is used herein to refer to any unmanned aerial vehicle (UAV). A 'UAV' will be understood to mean to any powered, aerial vehicle that does not carry a human operator, uses aerodynamic forces to provide vehicle lift, can fly autonomously or be piloted remotely, and can be expendable or recoverable. The UAV may be powered by an on-board fuel source, such as a combustible fuel and/or an electric battery. Alternatively or additionally, the UAV may be powered by one or more solar cells carried by the UAV. The term 'weather drone' refers to any drone or UAV configured to measure one or more parameters indicative of weather. The first sensor may be one or more of a humidity sensor, a solar sensor, a wind speed sensor, a temperature sensor and a pressure sensor.

In some embodiments, the processor is further configured to turn off the first sensor, if the processor determines that the data exceeds the first threshold value and/or falls below a second threshold value. This may advantageously help to reduce power consumption within the weather drone. This may be particularly advantageous if the first sensor has malfunctioned in a way, which means that it is drawing additional power from within the weather drone.

In some embodiments, the weather drone further comprises a wireless communication module, configured to communicate with a base station. The wireless communication module may communicate via one or more of a radio link and a satellite link.

In some embodiments, if the processor determines that the data from the first sensor exceeds the first threshold value and/or falls below the second threshold value, the processor is configured to send a message to the base station via the wireless communication module. The message may indicate that the first sensor has measured data exceeding the first threshold value and/or falls below the second threshold value. The processor may be further configured to prevent the storage of further data from the first sensor in the memory, only in response to the wireless communication module receiving a reply message from the base station, instructing the processor to prevent the storage of further data from the first sensor in the memory. In this way, the weather drone is able to inform the base station about a potential malfunction in the first sensor, and seek instruction from the base station, before taking any definitive action in respect of the first sensor. The decision at the base station regarding how to instruct the weather drone may be performed by a human operator at the base station. Alternatively, the decision at the base station may be performed by computer resources hat the base station having decision making functionality, such as a rules based engine. By providing a check in the form of a simple message, which may be relayed to the base station, less bandwidth needs to be used and the base station does not need to receive the full set of measurement data from the weather drone.

In some embodiments, the weather drone further comprises a navigation module. The navigation module may provide the weather drone with autonomous flying capabilities. The navigation module may enable the weather drone to fly between a first location and a second location on instruction.

In embodiments where the weather drone comprises a navigation module, the processor may be further configured to instruct the navigation module to initiate a return to base flight mode if the processor determines that the data exceeds the first threshold value and/or falls below the second threshold value. Under such an instruction, the weather drone automatically navigates itself to a pre-defined base location. The base location may be a hub for a fleet of drones. The base location may be a base station, which has facilities for interacting with the processor of the weather drone, and for analysing any weather data stored on the memory of the drone. By instructing the navigation module to initiate a return to base flight mode if the processor determines that the data exceeds the first threshold value and/or falls below the second threshold value, the weather drone can advantageously automatically return itself to a base station, when a potential malfunction has been identified in the first sensor.

In some embodiments, the weather drone further comprises a second sensor configured to repeatedly measure one or more parameters indicative of weather. The second sensor may be being coupled to the processor and the memory. Parameters measured by the second sensor may be stored as data on the memory of the weather drone. The second sensor may be one or more of a humidity sensor, a solar sensor, a wind speed sensor, a temperature sensor and a pressure sensor.

In some embodiments, if the processor determines that data from the first sensor exceeds the first threshold value and/or falls below the second threshold value, the processor may be further configured to turn off the second sensor. In some embodiments, if the processor determines that data from the first sensor exceeds the first threshold value and/or falls below the second threshold value, the processor may be further configured to prevent the storage of further data from the second sensor in the memory.

Such actions may be advantageous for a number of reasons. For example, this may be advantageous if the parameters measured by the first sensor need to be measured in tandem with the parameters measured by the second sensor, since this avoids unnecessary recording and storage of the second sensor's data, once a potential fault has been identified in the first sensor. Another advantage occurs if the weather data is returning itself to base in response to detecting a potential fault in the first sensor. In such scenarios, the data measured by the second sensor may not be of value or use since it is being captured in a return to base portion of the weather drone's flight, and not in the previously scheduled measuring portion of the weather drones flight. That is, the second sensor would otherwise be recording data from a geographical region, which may not be of interest. This would otherwise result in storage of redundant data in the memory of the weather drone from the second sensor, and/or unnecessary use of power and computational resource within the weather drone.

In some embodiments, the processor is further configured to analyse data from the second sensor as it is being recorded by the second sensor, and determine if the data from the second sensor exceeds a third threshold value and/or falls below a fourth threshold value. In such embodiments, the processor may be further configured to prevent the storage of further data from the second sensor in the memory, if the processor determines that the data from the second sensor exceeds the third threshold value and/or falls below the fourth threshold value.

By arranging for the processor to stop storage of data from the first and second sensors each time one shows sign of potential malfunction, the weather drone can prevent unnecessary capture and storage of weather data from its sensors. Where the weather drone comprises two or more sensors, the processor is preferably configured to prevent storage of data from said two or more sensors, any time the processor identifies an above or below threshold value being measured by one of said two or more sensors.

In some embodiments, the processor is configured to determine the number of times data recorded by the first sensor exceeds the first threshold value and/or falls below the second threshold value. In such embodiments, the processor may be configured to prevent the storage of further data from the first sensor in the memory, only in response to the processor determining that data recorded by the first sensor has exceeded the first threshold value and/or fallen below the second threshold value more than a predetermined number of times. Such embodiments may advantageously help to account for circumstances where a sensor of the drone only takes an abnormal reading on a limited number of times, such as once or twice. In such scenarios, it may be that the sensor of the drone has not completely malfunctioned and therefore no decisive action needs to be taken immediately. Instead, the processor of the weather drone can monitor for repeat occurrences of the abnormal reading and only take decisive action—such as stopping further readings, switching off the sensor, returning to base, and so forth—if an abnormal reading is taken on a significant number of occasions.

The significant number of occasions will vary based on a number of factors, including sensor type. However, by way of example the processor may only take action when the data recorded by the sensor exceeds the first threshold value and/or falls below the second threshold value more than five times, or more than ten times, or more than twenty times, or more than one hundred times.

In some embodiments, if the processor determines that the data exceeds the first threshold value and/or falls below the second threshold value on at least one occasion the processor may be configured to prevent the storage of any further data from the first sensor in the memory, or prevent the storage of all further data from the first sensor in the memory. In some embodiments, if the processor determines that the data exceeds the first threshold value and/or falls below the second threshold value on at least one occasion the processor may be configured to prevent the recording of any further data by the first sensor, or prevent the first sensor from making further measurements of the one or more parameters indicative of weather.

It will be appreciated that preferred features described above in relation to the first aspect of the invention may also be applicable to the second aspect of the invention.

In one aspect of the invention there is provided a weather drone comprising a first sensor configured to repeatedly measure one or more parameters indicative of weather; a memory coupled to the first sensor and configured to store data recorded by the first sensor, the data comprising a series of repeatedly measured parameters; a processor coupled to the first sensor and the memory; and a wireless communication module, configured to communicate with a base station. The processor is configured to analyse the data as it is being recorded by the first sensor, and determine if the data exceeds a first threshold value and/or falls below a second threshold value. If the processor determines that the data exceeds the first threshold value and/or falls below the second threshold value, the processor is configured to send a message to a base station via the wireless communication module, the message indicating that the first sensor has measured data exceeding the first threshold value and/or falls below the second threshold value. The processor is configured to prevent the storage of further data from the first sensor in the memory in response to the wireless communication module receiving a reply message from the base station, instructing the processor to prevent the storage of further data from the first sensor in the memory.

BRIEF DESCRIPTION OF THE DRAWINGS

The invention will now be further described, by way of example only, with reference to the accompanying drawings in which:

FIG. 1 is a schematic representation of the infrastructure of a weather drone according to an embodiment of the invention.

DETAILED DESCRIPTION

As shown in FIG. 1, the weather drone 100 comprises a first sensor 101. The first sensor 101 is a temperature sensor and configured to repeatedly measure a temperature of the environment surrounding the weather drone 100, as an indication of weather.

The weather drone 100 also comprises a second sensor 102. The second sensor 102 is a relative humidity sensor, and configured to repeatedly the relative humidity of the environment surrounding the weather drone 100, as an indication of weather.

The first and second sensors 101, 102 are each coupled to a memory 103. The memory is configured to store data recorded by the first and second sensors 101, 102. The first and second sensors 101, 102, and the memory 103 are each coupled to a processor 104.

The processor 104 is also coupled to a communications module 105, which may comprise a satellite uplink and/or radio frequency transceiver. The communication module 105 can enable wireless communications between the weather drone 100 (and in particular the processor 104), and a ground based base station 20.

The processor 104 is also coupled to a navigation module 106. The navigation module 106 provides the weather drone 100 with autonomous flying capabilities. The navigation module 106 also enables the weather drone 100 to fly between a first location and a second location on instruction.

The navigation module 106 is therefore coupled to a propulsion system 107 of the weather drone 100. The propulsion system 107 uses aerodynamic forces to provide vehicle lift to keep the weather drone 100 airborne, and may comprise one or more propeller engines. Coupled to the propulsion system 107 is a fuel source 108 for the weather drone 100, in the form of an electric battery.

The processor 104 is configured to analyse the measured weather data as it is being recorded by the first sensor 101 and/or second sensor 102, and initiate certain actions if the data measured by the first sensor 101 and/or second sensor 102 exceeds and/or falls below certain respective threshold values. By way of example if the first sensor 101 records a data value of above a threshold of 100 degrees Celsius, the processor may do one or more of: turn off the first sensor 101; prevent the storage of further data from the first sensor 101 in the memory 103; turn off the second sensor 102; prevent the storage of further data from the first sensor 101 in the memory 103; instruct the wireless communication module 105 to send a message to the base station 20, the message indicating that the first sensor 101 has measured data exceeding the threshold of 100 degrees Celsius; and instruct the navigation module 106 to initiate a return to base flight mode.

The memory 103 may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

In some embodiments, the memory may be configured to store data recorded by the first sensor at least until the drone has returned to the base.

The invention claimed is:

1. A weather drone comprising:
    a first sensor configured to repeatedly measure one or more parameters indicative of weather;
    a memory coupled to the first sensor and configured to store data recorded by the first sensor, the data comprising a series of repeatedly measured parameters;
    a processor coupled to the first sensor and the memory; and
    a navigation module,
    wherein the processor is configured to analyze the data as it is being recorded by the first sensor, and determine if the data exceeds a first threshold value and/or falls below a second threshold value,
    wherein if the processor determines that the data exceeds the first threshold value and/or falls below the second threshold value on at least one occasion, the processor is configured to prevent the storage of any further data from the first sensor in the memory, and wherein the processor is further configured to instruct the navigation module to initiate a return to base flight mode if the processor determines that the data exceeds the first threshold value and/or falls below the second threshold value.

2. The weather drone according to claim 1, wherein the processor is further configured to turn off the first sensor, if the processor determines that the data exceeds the first threshold value and/or falls below a second threshold value.

3. The weather drone according to claim 1, wherein the drone further comprises a second sensor configured to repeatedly measure one or more parameters indicative of weather, the second sensor being coupled to the processor and the memory, and wherein, if the processor determines that data from the first sensor exceeds the first threshold value and/or falls below the second threshold value, the processor is further configured to turn off the second sensor.

4. The weather drone according to claim 3, wherein the processor is further configured to analyze data from the second sensor as it is being recorded by the second sensor, and determine if the data from the second sensor exceeds a third threshold value and/or falls below a fourth threshold value, and wherein, if the processor determines that the data from the second sensor exceeds the third threshold value and/or falls below the fourth threshold value, the processor is configured to prevent the storage of further data from the second sensor in the memory.

5. The weather drone according to claim 1, wherein the processor is configured to determine a number of times data recorded by the first sensor exceeds the first threshold value and/or falls below the second threshold value, and wherein the processor is configured to prevent the storage of further data from the first sensor in the memory in response to the processor determining that data recorded by the first sensor has exceeded the first threshold value and/or fallen below the second threshold value more than a predetermined number of times, wherein the predetermined number is greater than one.

6. A weather drone comprising:
a first sensor configured to repeatedly measure one or more parameters indicative of weather;
a memory coupled to the first sensor and configured to store data recorded by the first sensor, the data comprising a series of repeatedly measured parameters;
a processor coupled to the first sensor and the memory;
a wireless communication module, configured to communicate with a base station; and
a navigation module,
wherein the processor is configured to analyze the data as it is being recorded by the first sensor, and determine if the data exceeds a first threshold value and/or falls below a second threshold value, and wherein if the processor determines that the data exceeds the first threshold value and/or falls below the second threshold value on at least one occasion, the processor is configured to send a message to the base station via the wireless communication module, the message indicating that the first sensor has measured data exceeding the first threshold value and/or falls below the second threshold value, and wherein the processor is configured to prevent the storage of further data from the first sensor in the memory in response to the wireless communication module receiving a reply message from the base station, instructing the processor to prevent the storage of any further data from the first sensor in the memory, and wherein the processor is further configured to instruct the navigation module to initiate a return to base flight mode in response to the wireless communication module receiving the reply message from the base station.

7. The weather drone according to claim 6, wherein the processor is further configured to turn off the first sensor in response to the wireless communication module receiving the reply message from the base station.

8. The weather drone according to claim 6, wherein the drone further comprises a second sensor configured to repeatedly measure one or more parameters indicative of weather, the second sensor being coupled to the processor and the memory, and wherein, in response to the wireless communication module receiving the reply message from the base station, the processor is further configured to turn off the second sensor.

9. The weather drone according to claim 6, wherein the processor is configured to determine a number of times data recorded by the first sensor exceeds the first threshold value and/or falls below the second threshold value, and wherein the processor is configured to send the message to the base station via the wireless communication module in response to the processor determining that data recorded by the first sensor has exceeded the first threshold value and/or fallen below the second threshold value more than a predetermined number of times, wherein the predetermined number is greater than one.

* * * * *